United States Patent Office

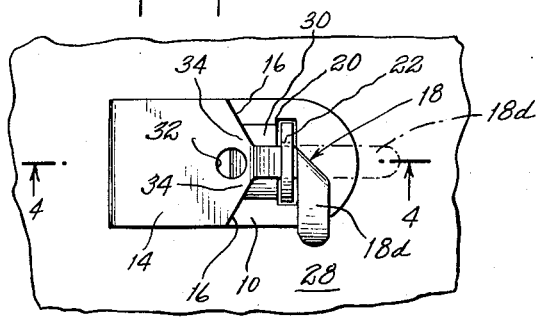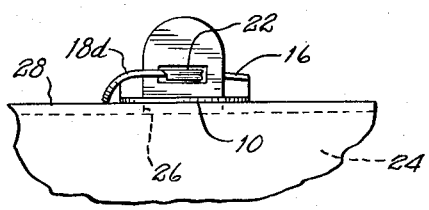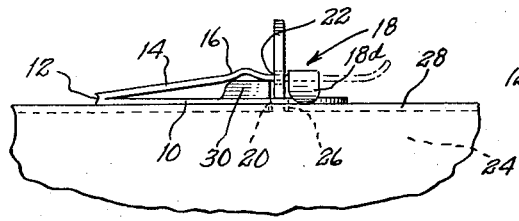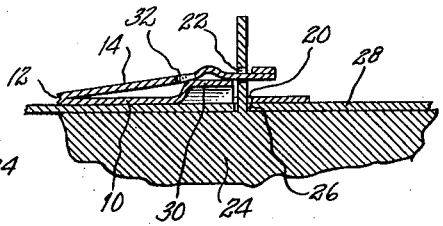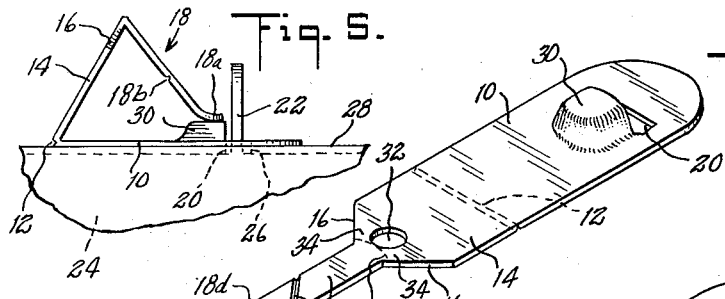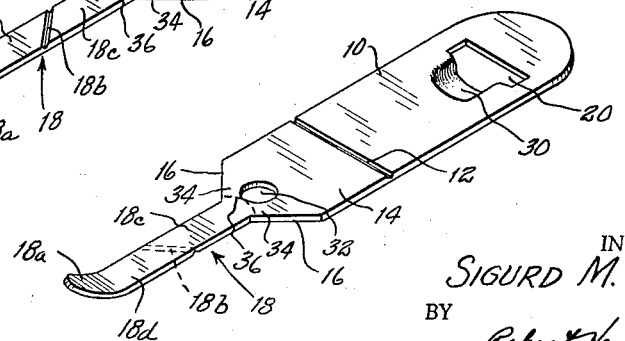
INVENTOR:
SIGURD M. MOBERG
BY
Robert Henderson
ATTORNEY

2,902,308
Patented Sept. 1, 1959

2,902,308

HAND-CLOSABLE SEAL

Sigurd M. Moberg, Pompton Plains, N.J., assignor to E. J. Brooks Company, Newark, N.J., a corporation of New Jersey Application September 24, 1957, Serial No. 685,959

2 Claims. (Cl. 292—307)

This invention relates to seals such as are employed to seal together two separable things in such manner that those things cannot be separated without so damaging the seal as to give clear evidence of tampering or without breaking the seal so that it cannot be re-used.

Such seals are commonly used for sealing covers to various devices such as meters or boxes. In many instances, they are used in place of a lock where only discouragement of and evidence of tampering are desired. In other instances, however, they are employed in addition to locks so that, even if an interloper were able to open the lock and re-close it, he still could not open the box or other device to which the seal is applied and re-seal it without breaking the seal.

This invention deals, more particularly, with seals of the above-indicated character wherein they may be applied quickly by hand and without the use of any tool.

An important object of this invention, therefore, is the provision of such a hand-closable seal.

Another important object is the provision of such a seal which is very inexpensive, being of such character that it can be made of inexpensive material and can be machine-produced economically in large quantities.

The foregoing and other more or less obvious objects are achieved according to the present invention, of which a preferred embodiment is shown in the accompanying drawing, for illustrative purposes, without, however, limiting the invention to the particular disclosed embodiment.

In the drawing:

Figure 1 is a top plan view of the subject seal as completely applied upon a cover to hold the latter in place upon a box or equivalent device.

Fig. 2 is an end elevational view of said device as viewed from the right side of Fig. 1.

Fig. 3 is a side elevational view of said device as viewed from the bottom of Fig. 1.

Fig. 4 is a sectional view substantially on the line 4—4 of Fig. 1.

Fig. 5 is a side elevational view of the device in position upon a cover in readiness for being closed and sealed to lock the cover into place upon a box or other device to which the cover is applied.

Fig. 6 is a perspective view looking down on the top of the device in what might be considered as an intermediate stage of its manufacture.

Fig. 7 is a perspective view looking at the bottom of the device in such an intermediate stage of its manufacture.

The structure of the illustrated seal may best be understood from Figs. 5, 6 and 7. It is made from a blank of thin sheet metal of a character suitable for yielding operation in the manner hereinafter described. In manufacturing the device, the sheet metal is cut to the shape shown in Figs. 6 and 7 and, also, is additionally processsed in a manner now to be described. The form of the blank and the mentioned processing thereof are such as to provide a flat body portion 10, which, at a straight, transverse score or line of weakness 12, adjoins a main seal-closing portion 14 which is preferably of about the same width as the body portion 10 but somewhat shorter than the latter and has tapering shoulders 16 leading to a sealing tongue 18 having an upwardly bent, free end 18a, and having on its upper side a straight, diagonal, transversely extending score or line of weakness 18b which serves to divide the sealing tongue into a secondary seal-closing portion 18c, adjoining the main seal-closing portion 14, and a seal-locking portion 18d toward the free end of the sealing tongue.

The body portion 10 has a portion thereof cut out to form a transverse slot 20 for accommodating therewithin a hasp-eye 22 (Figs. 1–5) which is integral with a box body 24 and extends through a slot 26 in a cover 28 to be sealed to the box body. The material bordering the side of slot 20 which is farthest from the free end of body portion 10 is pressed or struck upwardly to form a dome 30 which, as hereinafter explained, functions as a guide for guiding the sealing tongue 18 into and through the hasp-eye 22. The seal also, preferably, is formed with an aperture 32 in the main seal-closing portion 14 at a point equidistant with respect to the two shoulders 16 and quite close to the inner end of the tongue 18, the purpose of this aperture being to provide areas 34 of limited amounts of sheet metal adjacent to the inner ends of the shoulders 16 to enable the metal of the device to bend across the device and substantially coincident with the inner ends of said shoulders and through the mentioned narrow areas 34 of metal, said bending line being indicated by a broken line at 36 in Figs. 6 and 7.

It may be considered that the device, as thus far described, is complete and ready for delivery by the seal manufacturer to the user. However, the seal may be used much more conveniently by the user if it is processed by the manufacturer by bending it to its shape as shown in Fig. 5, wherein the main seal-closing portion 14 extends upwardly at an acute angle in relation to the flat body portion 10 and the tongue 18 extends downwardly in acute angularity with respect to the main seal-closing portion 14 with the bent free end 18a of the sealing tongue either close to or actually resting upon the top of the dome 30 and toward one side of the slot 20. It may be noted that the bend between the flat body portion 10 and the main seal-closing portion 14 is along the line of weakness 12 and that the bend between the main seal-closing portion 14 and the sealing tongue 18 is along the line indicated at 36 in Figs. 6 and 7.

To utilize the device to seal the cover 28 onto the box body 24 and, more particularly, to provide a seal through the hasp-eye 22 so that the latter cannot be withdrawn from the slot 26 in the box cover, the user, if he has received the device in the more or less flat form indicated in Figs. 6 and 7, will first bend it to the shape indicated in Fig. 5. If he has received the device from the manufacturer in its shape as shown in Fig. 5, or after he himself has bent it to that shape, he then places the device on the box cover with the flat body portion 10 lying flat upon the cover and with the hasp-eye 22 extending upwardly, as indicated, through the slot 20. Then, he applies finger pressure upon the main seal-closing portion 14 near its upper end to force the latter to pivot rightwardly and downwardly from its position as shown in Fig. 5 to its position as shown in Figs. 3 and 4. During this downward pivoting of the main seal-closing portion 14, the tongue 18, guided into and through hasp-eye 22 by the dome 30, moves to a position, as shown in Fig. 3, in which it lies approximately parallel to the flat body portion 10 and to the flat surface of the box cover. Then, the device is sealed by bending the seal-locking portion 18d arcuately, first upwardly and then downwardly in a continuing arcuate motion from its broken-line position to its full-line position shown in Fig. 1, so that the said portion 18d, in effect, is turned upside down, right-angularly to its previous position and, as thus finally bent, the bent free end 18a will extend downwardly into the plane of the flat body portion 10 and into close proximity to the flat surface of the cover, to minimize the possibility that said portion 18d might accidently be engaged and bent, thereby unintentionally breaking the seal.

It may be observed that the aperture 32, by providing the narrow metal areas 34 across which the bend 36 occurs, enables the latter bend to be almost completely flattened out to its condition as in Fig. 3 by the application of a relatively light finger-applied force upon the main seal-closing portion 14, and, in view of the lightness of said force and the ease with which the mentioned flattening occurs at the bend 36, the stress to which the tongue 18 is subjected along the diagonal score line 18b is insufficient to cause the tongue to bend at said score line during the passing of said tongue into and through the hasp-eye 22.

Inasmuch as the seal-locking portion 18d of the tongue, in its sealing position as shown in Fig. 1, cannot be withdrawn from the hasp-eye 22, it follows that, to open the seal, the portion 18d must be bent back to its position shown in broken lines in Figs. 1 and 3. When thus bent back, the portion 18d of the tongue will almost certainly break away at score line 18b, so that that particular seal may not thereafter be re-used. That condition operates to defeat tampering or opening of the box by unauthorized persons, as such persons would not be able to re-use the seal and would not have other similar seals to use in place of the broken seal.

The seal, as illustrated, provides an additional safeguard against tampering, to take care of a situation in which bending of tongue portion 18d back to its said broken-line condition of Figs. 1 and 3 might not have the effect of causing that portion to break away along the score line 18b. This additional safeguard resides in the provision of the score line 12, for it will be appreciated that one who might succeed in bending tongue portion 18d back without breaking it off, would still have to bend the main seal-closing portion 14 upwardly to return it and the tongue 18 to their positions shown in Fig. 5, in order to remove the cover from the box. It is quite certain that such reverse bending of the device at the score line 12 would cause breakage along that line. Even if an interloper were to succeed in opening the device to the extent indicated in Fig. 5 without breaking it, any attempt on his part to re-use the device would involve further bending at both score lines 12 and 18b, and there is no possibility that such additional bending could take place without breakage of the device.

It should be apparent that the seal disclosed and described herein may be made very economically and may be used without the necessity of employing any tools and that it, therefore, achieves the stated objects of this invention.

It should also be obvious that the concepts hereinbefore described may be used in various other types and designs of seals without, however, departing from the invention as set forth in the following claims.

I claim:
1. A seal comprising a body portion, a main seal-closing portion, a secondary seal-closing portion, and a seal-locking portion, all said portions being integral, adjoined serially at intervening weakened areas in the recited order, and of material of substantially uniform thickness, and the seal being readily bendable at the weakened areas; said body portion having a slot therein in which a hasp-eye may be so disposed as to protrude above said body portion, said seal-locking portion and said secondary seal-closing portion being adapted to pass, respectively, over the body portion and through the hasp-eye after the latter is extended through said slot; said weakened area between said seal-locking portion and said secondary seal-closing portion being a readily frangible line of weakness, and said seal-locking portion being bendable relatively to said secondary seal-closing portion along said line of weakness to an abutting position in relation to the hasp-eye to oppose withdrawal of said secondary seal-closing portion from the hasp-eye.

2. A seal according to claim 1, said body portion having a dome, protruding above its general plane, said dome having a surface on which the end of said seal-locking portion is guided toward the hasp-eye.

References Cited in the file of this patent
UNITED STATES PATENTS

| 972,971 | Wood | Oct. 18, 1910 |
| 1,017,837 | Wood | Feb. 20, 1912 |
| 2,771,314 | Canter et al. | Nov. 20, 1956 |

Dedication

2,902,308.—*Sigurd M. Moberg*, Pompton Plains, N.J. HAND-CLOSABLE SEAL. Patent dated Sept. 1, 1959. Dedication filed Feb. 9, 1972, by the assignee, *E. J. Brooks Company*.

Hereby dedicates to the Public the term thereof remaining after Oct. 1, 1970.

[*Official Gazette July 11, 1972.*]